BINARY SEQUENCE PATTERN MONITOR APPARATUS

Filed Sept. 2, 1966

INVENTOR.
CHARLES H. BRENNER

BY

Herbert E. Farmer
ATTORNEY

United States Patent Office 3,506,962
Patented Apr. 14, 1970

3,506,962

BINARY SEQUENCE PATTERN MONITOR APPARATUS

Charles H. Brenner, Scottsdale, Ariz., assignor to the United States of America as represented by the Secretary of the Air Force Filed Sept. 2, 1966, Ser. No. 577,100
Int. Cl. H03k *13/32;* G01c *25/00*
U.S. Cl. 340—146.1 3 Claims

ABSTRACT OF THE DISCLOSURE

An integrator with an RC time constant approximately equal to (1/shift rate) of a binary pseudo random character generator is used to provide a sync signal and to verify the randomness of the sequence.

Figure 1:
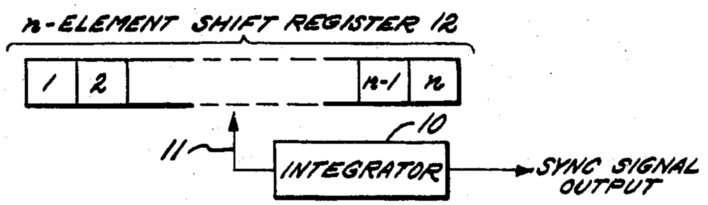

This invention relates to communication systems, and more particularly to binary sequence pattern monitor apparatus designed to recognize the repetitions and the character or structure of a repetitive pseudo random binary sequence.

There are many binary psuedo random character generators in use today. An M-sequence generator or maximum length recurrent sequence generator is one such type. An M-sequence is formed by starting with a binary shift register of any arbitrary length N; then taking binary information from J elements of the elements in the shift register and combining the J bits of binary information Modulo-2. The result of the Modulo-2 calculation is then fed back or loaded into the first element of the shift register.

An M-sequence will repeat itself every ($2^N$–1) bits or shifts; where N is the number of elements in the shift register. To make the generator maximum length, the J (where $J<N$) number of taps which feed the Modulo-2 adder must be connected to the proper elements in the shift register.

The four properties of an M-sequence that are of particular importance are:

(1) The M-sequence repeats itself every ($2^N$–1) bits.

(2) Once and only once in every cycle of ($2^N$–1) bits the N element shift register will contain all binary "ones."

(3) The M-sequence generator output appears to be random.

(4) In most cases there are different possible combinations of J feedback taps which will produce an M-sequence length ($2^N$–1) bits for an N element shift register.

Since the M-sequence generator is a feedback device, once it is started, it continually recycles. This very desirable feature can also lead to some problems. For example, assume there are two identical M-sequence generators which are running independently, and it is desired to know by how many bits or binary shifts the generators are out of time synchronism. The classical way of performing this measurement is to add a diode recognize bus to the N elements of the shift register. Since once, and only once, every cycle a condition of all "ones" exits in the shift register, this condition can be recognized by the diode bus. This gives a fixed point (sinc pulses) in the cycle from which phase or, equivalently "bits out of sinc" measurements can be made between the two identical M-sequence generators.

The N element shift register is composed of N flip-flops or bistable multivibrators. There are N diodes, with each diode connected to the left (or right) hand collectors of all the N bistables. Assume that all the diodes are connected to the right hand collectors of the bistables, and that a "one" is indicated by zero volts on the right hand collector, and that a "zero" is indicated by +V volts. If a "zero" appears in any shift register element, the corresponding diode will be forward biased to conduct and the output will be $+V-V_{OR}$ (the drop across the conducting diode). However, when a condition of all "ones" appears in the N element shift register, none of the N diodes will conduct (since they all have zero bias across them), and the output voltage will drop to zero. By using negative power supplies and reversing the direction of the diodes, or returning the resistor to a supply voltage, or by some combination of the above three items, a pulse of different polarity and DC level can be formed. The important fact is, however, that it still gives the same amount of information and requires the same number of parts.

This method of obtaining a sync pulse has three inherent disadvantages:

(1) Each diode has an equivalent shunt capacity across the diode. In the operation of a high speed shift register this capacity can be large enough to prevent the shift register from running correctly. To reduce the capacitive loading effects would require the addition of N buffer amplifiers.

(2) The register R loads the bistables in the shift register. As the number of bistable N increases or the speed of the shift register increases, the value of R must be decreased because the shunt capacity of the diodes reduces the amplitude of the sync pulse. As the value of R is decreased, the point is quickly reached where N additional buffer amplifiers must be added to prevent excessive loading on the bistables.

(3) As N becomes large, the number of diodes becomes large, the cost of the sync pulse producing circuit increases, and its reliability is reduced.

The sync pulse is normally used to provide an external trigger to an oscilloscope. The availability of the sync pulse is almost mandatory for performance checking of two independent M-sequence generators.

Accordingly, a primary object of this invention is to provide a binary sequence pattern monitor apparatus which obviates the above-mentioned disadvantages by obtaining the sync signal in a much easier manner through the utilization of an integrating circuit which can be connected to any desired element in an n-element shift register.

The foregoing and other objects, features, and advantages of the invention as well as the invention itself as to its organization and mode of operation, may be best understood from the following description when read in connection with the accompanying drawings wherein:

FIGURE 1 is a block diagram of the instant recognition technique; and

Figure 2A:
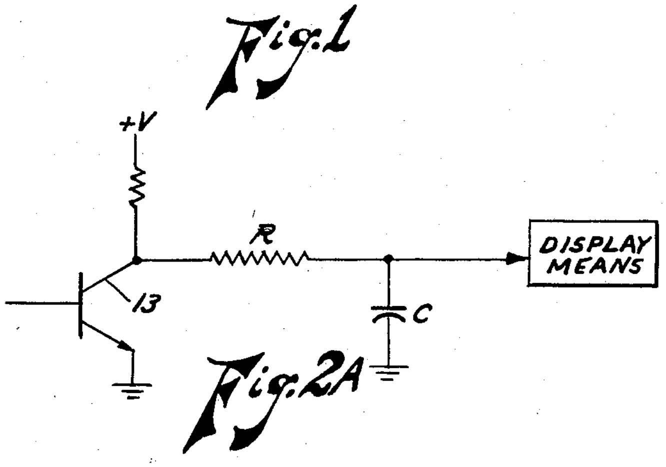
Figure 2B:
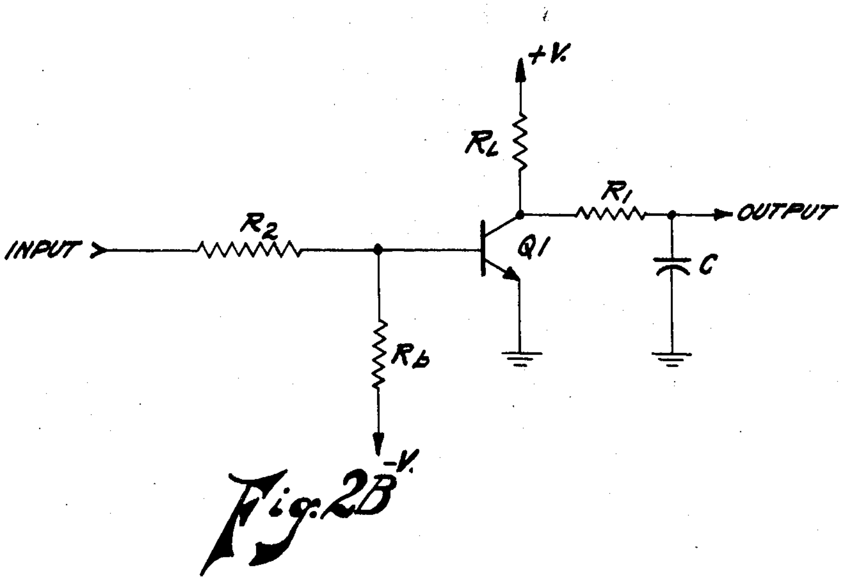

FIGURES 2(A) and 2(B) illustrate a simple integrator and a buffered input integrator, respectively.

Now referring to FIGURE 1, integrating circuit 10 can be connected to any element of n-element shift register 12 (with feedback not shown). An M-sequence is formed by starting with a binary shift register of any arbitrary length N; then taking binary information from J elements of the elements in the shift register and combining the J bits of binary information Modulo-2. The result of the Modulo-2 calculation is then fed back or loaded into the first element of the shift register. The fact that integrator 10 can be connected to any element via conductor 11 in shift register 12 is a distinct advantage since, in normal usage, some of the bistables 1, 2 . . . *n*-1, *n* will have external loads connected to them. In this case, integrator 10 would be connected to one of the bistables which does not have an external load connected to it. This means that a buffer amplifier would normally not have to be added to support the additional load of the integrator.

The circuit diagram of integrator 10 is shown in two forms, FIGURE 2(A) and FIGURE 2(B). First, consider the simple integrator circuit, FIGURE 2(A). Assume that the input comes from the collector 13 of some arbitrary bistable in the shift register and the output of the simple integrator circuit is connected to the display means. R must be kept large enough so that it does not load the shift register bistable excessively. As a design guide, R should be approximately 5 times the value of the bistable collector resistor. The capacitor C is selected so the RC time constant is approximately equal to (1/shift rate) of the M-sequence generator.

The "simple integrator" operates satisfactorily but has a small output signal. The output signal can be increased by a factor of ~5 to 20 times by using the "buffered input integrator" shown in FIGURE 2(B). First consider the transistor amplifier formed by $R_2$, $R_b$, $R_L$ and $Q_1$. The criteria used in designing this amplifier is given below. $R_2$ is made small, but not to exceed the load requirements of the shift register bistable to which it is connected. After $R_2$ has been selected, $R_b$ is calculated to provide sufficient reverse bias with $Q_1$ in the "off" condition. $R_L$ is made as small as possible while still allowing $Q_1$ to be saturated with $Q_1$ in the "on" condition. $R_1$ is chosen so that it is approximately 3 to 5 times $R_L$. C is selected so that the $R_1C$ time constant is ~(1/shift rate).

The "buffered input integrator" provides a good sync signal for an oscilloscope. The advantages of this circuit in comparison to the conventional diode recognize bus technique are: it does not suffer from the problems of diode capacity loading and heavy diode AND or OR gate loading, and it requires fewer parts, and provides an oscilloscope presentation which permits simple qualitative recognition of a binary word.

An oscilloscope photograph of three different 4095 bit M-sequence patterns, running at 5 mHz. was taken. The code repeats itself every 4 cm. or ~418 $\mu$s. (200 $\mu$s./cm.). The scope grid lines were spaced 1 cm. apart. The repetition cycle was very pronounced when observing a repetition of the large spike (corresponding to 12 "ones") from which the scope was synchronized. The large spike appeared at the second, sixth and tenth grid lines from the left in each case. A flat-bottomed scope pattern (to emphasize the large spikes) was obtained using a "buffered input integrator" with modified design criteria. Specifically, referring to FIGURE 2(B), $R_L$ was selected to be 1000 ohms and $R_1$ was selected to 100 ohms. A 2N706B transistor $Q_1$ was used, having a collector saturation resistance $R_{cs} \approx 40$ ohms. Assume a "zero" appears as a +V volts inputs to the "buffered input integrator" and a "one" appears as 0 volts. Each "one" will cause $Q_1$ to be cutoff and allow C to charge toward the positive supply potential, the charging time constant being equal to $(R_L+R_1)C=1100C$ seconds. Each "zero" will cause $Q_1$ to conduct to saturation and allow C to discharge toward ground quite rapidly, the discharge time constant being equal to $(R_1+R_{os})C \approx 140C$ seconds. Since $R_L$ is about 25 times larger than $R_{os}$, the capacitor C will discharge very quickly to the 0 volt reference and will remain at 0 volts if any further "zeros" are received.

Besides producing a sync signal, the integrator can also give valuable information about the character of a binary sequence which may be used to recognize the binary word therein selected.

As was mentioned earlier, normally there are many possible combinations of J feedback taps that will generate an M-sequence from a shift register of length N. At present, an often used guide for the system designer is to select a function or combination of taps which involves the least amount of electrical equipment. This is not the optimum method, however, since the structure, or character, of the M-sequence varies with different feedback tap combinations, although the word length remains the same. Structure is important in anti-jam communications work because it influences the short interval jam-resistant capability of a spread spectrum system. The only way known, at present, to determine the sequence structure, or code distribution, is to perform a digital computer study, normally a relatively expensive procedure.

Oscilloscope photographs were taken from a "buffered input integrator" output while it monitored a 4095 bit M-sequence generator using five different feedback tap combinations; i.e. five different structures or codes were used.

The pattern was more symmetrical about a reference level, rather than flat-bottomed. Specifically, referring to FIGURE 2(B), $R_L$ was selected to be 270 ohms and $R_1$ was selected to be 1000 ohms. The same transistor $Q_1$ was used hence $R_{os} \approx 40$ ohms. The "one" and "zero" inputs to the integrator control the transistor $Q_1$ and, thereby, the charge and discharge of C as previously described. In this case, however, the charging time is equal to $(R_L+R_1)C=1270C$ seconds, and the discharge time is equal to $(R_1+R_{os})C \approx 1040C$ seconds; the ratio of charge to discharge time is much more nearly equal. Also, since $R_L$ is only about 6.75 times larger than $R_{os}$, the capacitor C will discharge (at almost the same rate as charge) toward a positive voltage reference (at the collector of $Q_1$). If any further "zeros" are received, it discharges below this positive voltage reference toward ground.

Some of the important parameters of an M-sequence which can be read from oscilloscope photographs are (the 4095 bit sequence is called the word):

(1) The word should not have many long segments of predominantly all "ones" or all "zeroes."

(2) The long segments of "ones" or "zeroes" should be approximately evenly distributed throughout the word. (Note.—If a sinusoidal carrier is bi-phase modulated by the binary word, a long run of "ones" or "zeroes" will produce a CW segment, more subject to jamming, rather than the desired random succession of phase reversals.)

As previously mentioned, long runs of "ones" are noted by large positive spikes and long runs of "zeroes" by large amplitude negative spikes.

Traces which show large fluctations indicate longer runs and, consequently, poorer balance. By taking a plurality of photographs, with each one representing a 1 cm. portion of the original photograph, the photographs can be analyzed to select the code with the best balance.

Additional photographs which show the three codes expanded again by 10 so that the first cm. now covers 10 cm.; this 100 times expansion of the first 0.1 cm. enables even closer analysis. For example: the last 4 cm. of code 1 showed a negative going trend, resulting from a preponderance of "zeroes"; the last 3 cm. of code 3 showed a positive going trend resulting from a preponderance of "ones"; and the second cm. of code 3 showed a negative going trace which is probably due to an all "zeros" run.

The unique feature of this sequence analyzing device is that it gives a rapid empirical first order indication of the code distribution. Hence, qualitative code distribution is determined much faster and at little expense compared to a digital or manual reduction.

While particular forms of the invention have been described, it is to be understood that numerous other arrangements may be readily devised by those skilled in the art which will still embody the principles of the invention and fall within the spirit and scope thereof.

I claim:

1. In combination with a binary pseudo random character generator means comprising a shift register of arbitrary length N and a modulo 2 adder with inputs from J stages of the shift register and an output which loads the input of the first stage of said shift register, wherein said register has a plurality of bistable elements, each of said bistable elements having collector resistor means, apparatus for qualitatively recognizing the code distribution of a binary word and for providing a sync signal comprising an integrator circuit having its input connected to the collector resistor means of an arbitrarily chosen one of said plurality of bistable elements, and display means connected to the output of said integrator circuit.

2. The apparatus as described in claim 1 wherein said integrator circuit comprises resistance means having a resistance value about five times the value of said collector resistor means and capacitance means having a capacitance value such that the RC time constant is about equal to the inverse of the shift rate of said character generator means.

3. The apparatus as described in claim 2 which further includes transistor amplifier circuit means connected prior to said resistance and capacitance in said integrator circuit to increase the magnitude of the output signal from said integrator circuit.

References Cited

UNITED STATES PATENTS

| | | | |
|---|---|---|---|
| 2,605,332 | 7/1952 | Parsons. | |
| 2,970,261 | 1/1961 | Zoll | 235—151.31 X |
| 3,035,228 | 5/1962 | Ratz | 340—179 X |
| 3,069,657 | 12/1962 | Green et al. | |
| 3,098,219 | 7/1963 | Voigt et al. | 235—153 X |
| 3,138,759 | 6/1964 | Thompson | 307—234 X |
| 3,294,981 | 12/1966 | Bose | 340—172 X |
| 3,329,947 | 7/1967 | Larrowe et al. | 340—347 X |

EUGENE G. BOTZ, Primary Examiner

R. S. DILDINE, Jr., Assistant Examiner

U.S. Cl. X.R.

235—151.31, 183; 307—234